US006584497B1

(12) United States Patent
Case et al.

(10) Patent No.: US 6,584,497 B1
(45) Date of Patent: Jun. 24, 2003

(54) METHOD, SYSTEM, AND PROGRAM FOR RETURNING A FILE REQUESTED THROUGH A NETWORK CONNECTION

(75) Inventors: Douglas Robert Case, San Jose, CA (US); Robert Clair Edwards, Jr., Susquehanna, PA (US); Lori Christine Simcox, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,331

(22) Filed: Jul. 28, 1999

(51) Int. Cl.$^7$ .............................................. G06F 13/00
(52) U.S. Cl. ...................... 709/217; 709/226; 709/238; 709/329
(58) Field of Search ................................ 709/217, 219, 709/223, 224, 226, 328, 329, 238

(56) References Cited

U.S. PATENT DOCUMENTS

| | | |
|---|---|---|
| 5,528,757 A | 6/1996 | Yamasaki |
| 5,727,147 A | 3/1998 | van Hoff |
| 5,740,430 A | 4/1998 | Rosenberg et al. |
| 5,784,564 A | 7/1998 | Camaisa et al. |
| 5,802,530 A | 9/1998 | van Hoff |
| 5,805,829 A | 9/1998 | Cohen et al. |
| 5,838,916 A | 11/1998 | Domenikos et al. |
| 5,867,667 A | 2/1999 | Butman et al. |
| 5,870,544 A | 2/1999 | Curtis |
| 5,878,218 A | 3/1999 | Maddalozzo, Jr. et al. |
| 5,890,172 A | 3/1999 | Borman et al. |
| 5,937,406 A * | 8/1999 | Balabine et al. ............ 707/100 |
| 6,356,863 B1 * | 3/2002 | Sayle ......................... 703/27 |
| 6,397,246 B1 * | 5/2002 | Wolfe ......................... 709/217 |

FOREIGN PATENT DOCUMENTS

GB 2316200 2/1998

OTHER PUBLICATIONS

U.S. patent application Ser. No. 09/191,256, filed Nov. 12, 1998, entitled "System and Method for Remotely Accessing a Client in a Client Server Environment".
Ron Riffe, "Straight Talk on ADSTAR Distributed Storage Manager (ADSM)", IBM Storage Systems Division Software Products, Dec. 1997, pp. 1–15.
"Installing the Clients", IBM ADSTAR Distributed Storage Manager, Version 3, Release 1, SH26–4080–02, Jan. 1999, pp. 54–55, 70–71, and 93–94.

* cited by examiner

*Primary Examiner*—Viet D. Vu
(74) *Attorney, Agent, or Firm*—David W. Victor; Konrad Raynes Victor & Mann LLP (57) ABSTRACT

Disclosed is a system, method, and program for processing a file request from an application program, such as a web browser. A file is maintained in a storage device accessible to a computer system. The file is capable of being accessed through a file system. A network connection is established with the application program using a network protocol. A request for the file is received from the application program via the network connection. A determination is then made as to whether the application program is executing in the computer system including the file system. If not, the file is transmitted over the network connection to the application program. Otherwise, the file is provided to the application program through the file system.

37 Claims, 3 Drawing Sheets

METHOD, SYSTEM, AND PROGRAM FOR RETURNING A FILE REQUESTED THROUGH A NETWORK CONNECTION

BACKGROUND OF THE INVENTION

1. Field of the Invention

The present invention relates to a method, system, and program for returning a file initially requested through a network connection and, in particular, returning the requested file through the network connection or the file system.

2. Description of the Related Art

The International Business Machines Corporation's (IBM) Tivoli Storage Manager (TSM), formerly known as the ADSTAR Distributed Storage Manager (ADSM), is a client-server program that provides storage management operations between one or more clients and a server. The TSM server program allows numerous clients to backup, archive, and migrate data residing in the client workstations, including data in databases and applications. The server program manages backup versions of files, archived copies of files, and migrated files. The TSM server program also selects the storage devices to use to backup the data. The TSM client component configures the client workstation to function as a client node to the TSM server. This allows the client to backup, archive, restore, and retrieve files through the server program in the server. TSM operates independently of human intervention to manage the storage environment and space in a network system.

A client computer can perform TSM client backup, archive, hierarchical storage management, and restore operations using the TSM specific graphical user interface (GUI) or a command line interface. Current versions of TSM include a web client applet, which allows a user to access the TSM client through a Web browser. A common Web browser may be used to perform storage management functions at the client computer, e.g., backup client data to the server. To access the web client applet from a remote machine, the user would direct the web browser at the remote machine to the TSM client which runs its own Hypertext Transfer Protocol (HTTP) server. The remote web browser would then run the web client applet to access the TSM client to perform such TSM client operations as determining status of backup operations, incremental and selective backup of new and changed files, and restore operations.

To access the web client on the TSM client, the remote web browser would issue an HTTP GET request for the uniform resource locator (URL) in the form of "http://YourMachineName:PortNumber." The web client applet can be served from many different client systems, including AIX, OS/2, SUN SOLARIS, HP-UX, WINDOWS NT and WINDOWS 95.** Further details of the current TSM clients are described in the IBM publication, "ADSTAR Distributed Storage Manager: Installing the Clients.Version 3," IBM document no. SH26-4080-02 (Copyright IBM, 1999), which publication is incorporated herein by reference in its entirety.

Currently, a web browser requests the web client applet each time the web browser wants to establish communication with the TSM client to perform storage management operations. This requires that the TSM client send the web client over the network connection to the web browser each time the web browser wants to establish a session with the TSM client. There is a need in the art for improved mechanisms for serving requested files, such as the web client applet, to the requesting web browser.

SUMMARY OF THE PREFERRED EMBODIMENTS

To overcome the limitations in the prior art described above, preferred embodiments disclose a system, method, and program for processing a file request from an application program. A file is maintained in a storage device accessible to a computer system. The file is capable of being accessed through a file system. A network connection is established with the application program using a network protocol. A request for the file is received from the application program via the network connection. A determination is then made as to whether the application program is executing in the computer system including the file system. If not, the file is transmitted over the network connection to the application program. Otherwise, the file is provided to the application program through the file system.

The network connection with the application program may be established using the TCP/IP protocol and the request for the file may be transmitted using the HTTP protocol. Further, the requested file may be a Java applet, HTML file, text file, image file, video file, XML file or program.

In further embodiments, the application program is a web browser. In such case, providing the web browser the file through the file system comprises returning a file to the web browser including a pathname of the requested file in the storage device. The web browser accesses the requested file through the file system using the pathname provided in the returned file.

Preferred embodiments further provide a method for interfacing with a storage management system in a computer system with an application program. A network connection is established with the application program using a network protocol. A request is received from the application program for a program in a storage device accessible to the computer system. The requested program is capable of being accessed through a file system. The program will allow the application program to interface with the storage management system. The requested program is transmitted to the application program via the network connection using the network protocol or directly to the application program through the file system. The application program executes the requested program to provide an interface with the storage management system to perform storage management operations on the computer system.

Preferred embodiments provide a mechanism for determining how to return a requested file to a requesting program, such as a web browser, based on the location of the web browser. If the web browser is communicating over a network communication line from a remote location, then the server will return the requested file using the network communication line and network protocols, such as TCP/IP and HTTP. However, if the server determines that the web browser initiating the request through the network connection is executing locally, then the server will return a page including a link to the pathname where the requested file is locally stored. The web browser will then submit a second request using the pathname to access the requested file through the file system. This method substantially improves performance by using the file system instead of network communications and network protocols to return a requested file. Performance improvements increase as the size of the requested file increases. Preferred embodiments utilize the fastest available method for returning requested files to a web browser or other application program requesting files through a network connection.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
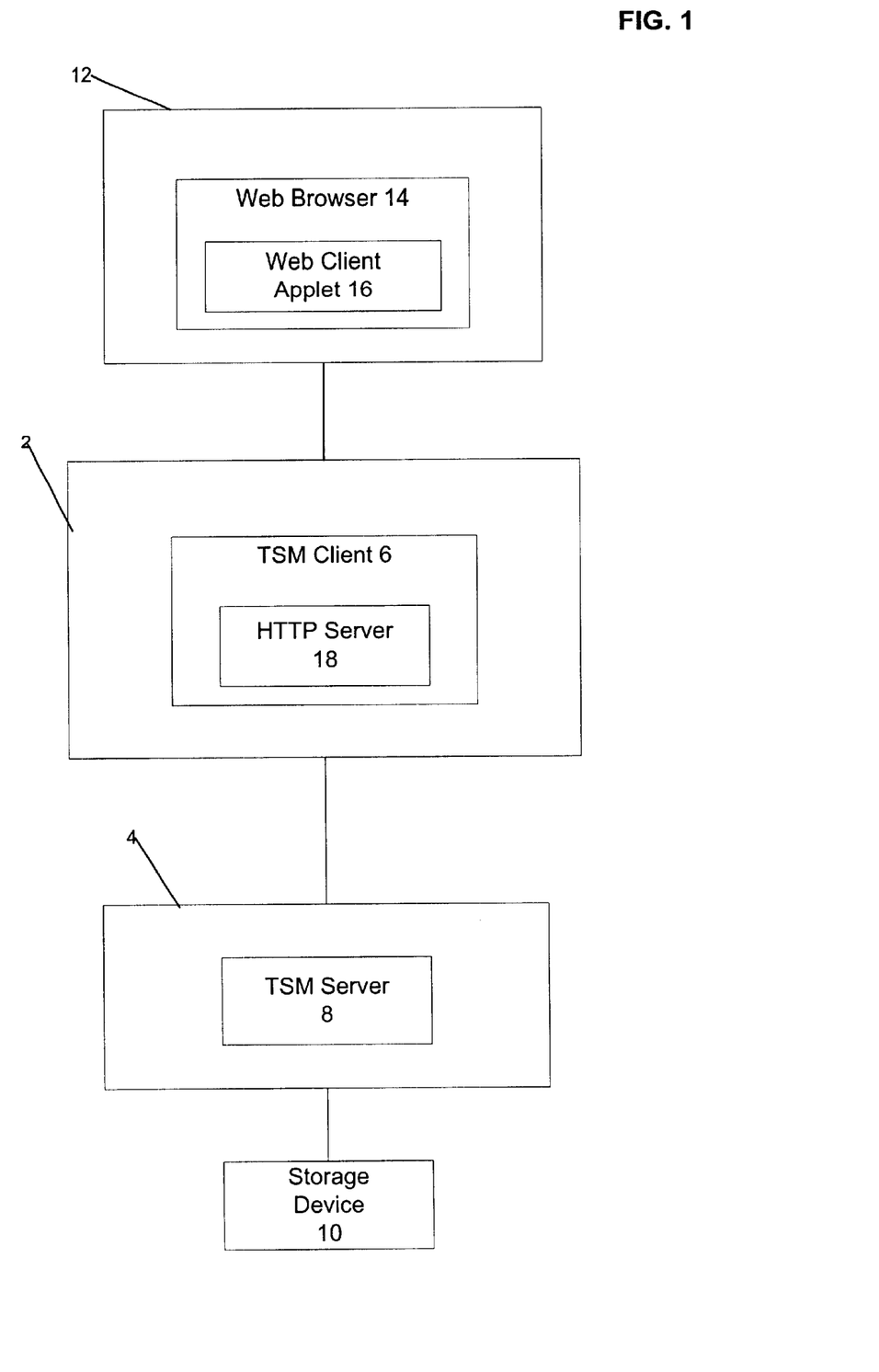
FIG. 1 is a block diagram illustrating a first computing environment in which preferred embodiments of the present invention are implemented.
Figure 2:
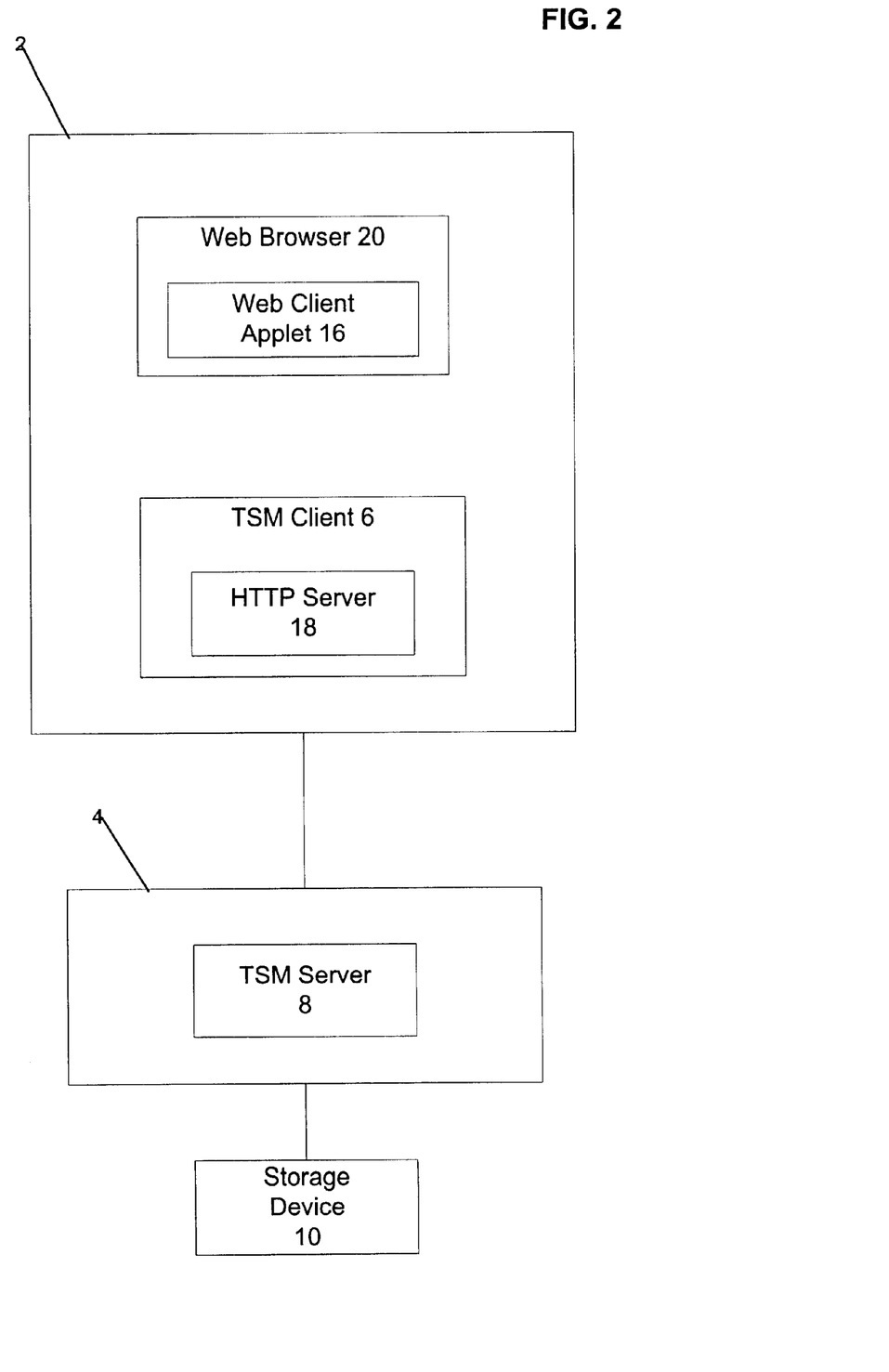
FIG. 2 is a block diagram illustrating a second computing environment in which preferred embodiments of the present invention are implemented.

FIGS. 1 and 2 illustrate computing environments in which preferred embodiments of the present invention are implemented. A client computer 2 is in communication with a server 4. The client 2 includes TSM client software 6 and the server 4 includes TSM server 8 software. The TSM client 6 allows data maintained in files and application programs within the client 2 to be transferred to the TSM server 8 for backup, archive, and migration in storage device 10, which may be any non-volatile storage device known in the art. With respect to FIG. 1, a remote computer 12 is capable of communicating with the client 2. The remote computer 12 includes a web browser 14 program, which may be any web browser program known in the art, e.g., NETSCAPE COMMUNICATOR and MICROSOFT INTERNET EXPLORER, that is JAVA compatible.** The client 2, server 4, and remote computer 12 may communicate using any network communication means known in the art, including LAN, Ethernet, WAN, System Area Network (SAN), Token Ring, LocalTalk, TCP/IP, the Internet, HTTP, HTTPS, etc. "HTTPS" is short for Secure Sockets Layer, which is the protocol for transferring private documents over the Internet using an encryption scheme.

The client 2 farther maintains a copy of a web client applet 16. The client 2 serves the web client applet 16 to web browser 14 running on remote computer 12 to allow the web browser 14 to interface with the TSM client 6 to perform backup, archive, restore, retrieve, migration, and recall operations. These remote operations are capable of causing the TSM client 6 to perform an operation with respect to the TSM server 8. The TSM client 6 includes a Hypertext Transfer Protocol (HTTP) server program 18 to allow for communication with the web client applet 16 running in the web browser 14. In this way, a user at the remote computer 12 could access certain TSM functions in the client 2 to cause the TSM client 6 to perform TSM storage operations, e.g., backup, archive, restore, etc. Further details of how the web client applet 16 running on a remote computer provides communication with the TSM (or ADSM) client 6 is described in the commonly assigned and copending patent application, entitled "System and Method for Remotely Accessing a Client in a Client Server Environment," to Douglas R. Case et al., having U.S. Ser. No. 09/191,256 and filed on Nov. 12, 1998. This patent application is incorporated herein by reference in its entirety.

FIG. 2 illustrates a further embodiment in which the client computer 2 includes a web browser program 20. In such case, to perform certain TSM operations, the user at the client computer 2 can use the TSM GUI, the command line interface or the web browser 20. The web browser 20 would access the TSM client 6 services through the web client applet 16. By allowing ubiquitous viewers to be used, such as the common Internet web browsers, users may use a familiar interface to access the TSM client 6 functions.

A user at the remote 12 web browser 14 or the client 2 web browser 20 can retrieve the web client applet 16 which provides an interface to allow a user through the web browser 14 or 20 to communicate with the TSM client 6 via the web client applet 16. The web client applet 16 executes within the web browser 14 or 20. As discussed, in preferred embodiments, the web browser 14 or 20 is Java enabled, and capable of executing the web client Java applet 16. The user would access this web client applet 16 by entering the following Universal Resource Locator (URL) (1) in the URL location of the web browser 14 or 20. A URL is the global address of documents and other resources on the World Wide Web.

$$\text{http://your\_machine\_name:1581} \tag{1}$$

The "your_machine_name" component is the host name of the machine on which the web browser 14 or 20 is running. For instance, your_machine_name may be the remote computer 12 name for browser 14 or the client 2 name for web browser 20. Alternatively, the user may enter the IP address of the machine instead of the name. Still further, a port number other than 1581 may be reserved for receiving requests for the web client applet 16. In preferred embodiments, the client 2 and remote 12 computers may communicate using the TCP/IP protocol. With the URL request (1), the browser 14 or 20 requests the web client applet 16 by providing the host name of the machine of the browser 14 or 20 to a predesignated port on which the HTTP server 18 is listening. The file name of the web client applet 16 is not included in the initial request for the applet. Thus, a request for web client applet 16 does not involve a direct request for the file, but instead involves contacting the port at which the TSM client's 6 HTTP server 18 is listening.

In preferred embodiments, when a user transmits an HTTP request for the web client applet 16 from remote web browser 14, in the form of request (1) above, the HTTP server 18 transmits an HTML page with a tag containing a hypertext link to the web client applet 18 in storage accessible to the client 2. Upon receiving the HTML page, the web browser 14 would then request the web client applet 16. Alternatively, when the local web browser 20 submits a request for the web client applet 16, the HTTP server 18 returns an HTML page including a "file" descriptor tag, e.g., "file:///" followed by the pathname of the web client applet 16 in the client 2. This allows the local web browser 20 to retrieve the web client applet 16 through the client's 2 file system using the returned pathname. After the web browser 14 or 20 obtains the web client applet 16 by requesting the applet from the HTTP server 18 or through the client's 2 file system, the browser 14 or 20 executes the web client applet 16 to establish an interface and session between the web browser 14 or 20 and the TSM client 6.

Accessing the Web Client Applet

Figure 3:
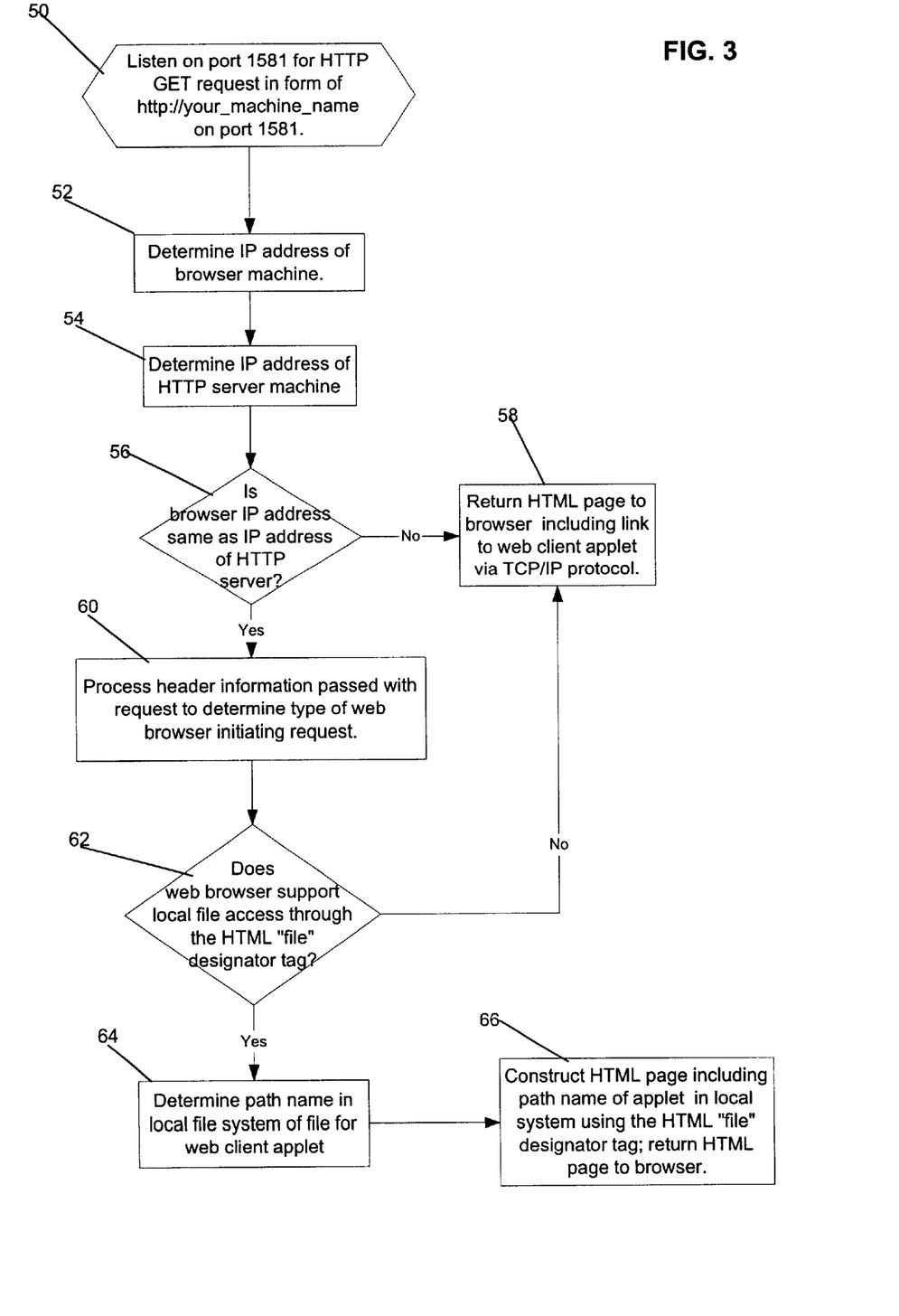
FIG. 3 illustrates logic to process a file request in accordance with preferred embodiments of the present invention.

The web browser 14 or 20 initially requests the web client applet 16 by issuing an HTTP GET command for the URL including the requesting machine name and the port on which the HTTP server 18 listens for requests for the web client applet 16, e.g., port 1581. FIG. 3 illustrates logic implemented in the HTTP server 18 to process the request for the web client applet 16, which is maintained in a non-volatile storage area accessible to the client 2, such as a hard disk drive, tape, etc. Control begins at block 50 where the HTTP server 18 is listening in on port 1581 for an HTTP GET request in the form of the URL "http://your-machine_name:1581". In preferred embodiments, the HTTP server 18 reserves a port, e.g., port 1581 or any other designated port, for requests for the web client applet 16. The HTTP server 18 determines (at block 52) the IP address of the machine in which the requesting web browser 14 or 20 is executing and the IP address (at block 54) of the HTTP server 18 machine, or the client 2.

After determining the IP addresses, the HTTP server 18 determines (at block 56) whether the IP address of the requesting browser 14 or 20 is the same as the IP address of the HTTP server 18, i.e., whether the web browser 14 or 20 initiating the request for the web client applet 16 is running in the client 2 or a remote computer 12.

If the IP addresses are different, then the HTTP server 18 accesses the HTML page with a hypertext link to the web client applet 16 in the client 2 and transfers (at block 58) this HTML page to the web browser 14 at the remote computer 12 using the HTTP protocol.

If the IP address of the machine on which the web browser 20 is running is the same as that of the machine on which the HTTP server 18 is running, i.e., the web browser 20 is running in the client 2, then the HTTP server 18 processes (at block 60) header information transmitted with the URL request to determine the type of web browser 20 submitting the URL file request on port 1581. For instance, Microsoft Internet Explorer places the string "MSIE" in the User-Agent header field of the request; Netscape Navigator includes the string "Mozilla/4.0" in the User-Agent field of the header information. In preferred embodiments, the HTTP server 18 maintains a list of web browsers that are capable of loading a file directly from the file system in response to receiving an HTML page including an HTML "file" designator tag and pathname of the file. For instance, it has been observed that certain browsers are not capable of using the HTML "file" designator tag to retrieve the file indicated in the pathname following the designator tag through the local file system.

The HTTP server 18 determines (at block 62) whether the web browser 20 is on the list of web browsers 20 capable of issuing a subsequent request for a file through the file system using the pathname returned in response to the initial file request. If the web browser 20 is not capable of retrieving the file directly from the local file system in response to receiving an HTML file including the pathname, then the HTTP server 18 transmits (at block 58) the HTML page to the web browser 20 via the TCP/IP network connection using the HTTP protocol. Otherwise, if the web browser 20 is capable of receiving an HTML "file" designator tag which indicates the pathname of the requested web client applet 16, then the HTTP server 18 determines (at block 64) the pathname where the web client applet is located on the local client 2 system, e.g., "d:/path/myappletjar." The HTTP server 18 then constructs (at block 64) an HTML page including the HTML "file" designator tag, e.g., "file:///", and the pathname of where the web client applet 16 is located in the client 2 storage, e.g., "file:///d:/path/myappletjar." This returned HTML page containing the HTML "file" designator and the pathname causes the web browser 20 to load the web client applet 16 directly through the client's 2 file system using the pathname.

With the logic of FIG. 3, if a user is using the web browser 20 on the client 2, not at a remote computer 12, then the HTTP server 18 will not use the HTTP protocol to return the web client applet 16. Instead, because the web browser 20 is running locally, the HTTP server 18 will return an HTML file including the HTML "file" designator tag and pathname, including file name, of the web client applet 16 in the client 2 system. This HTML "file" designator tag causes the web browser 20 to retrieve the applet 16 directly from the local client 2 file system in response to receiving the HTML page constructed at block 66. The logic of FIG. 3 has been found to substantially reduce the time to serve the web client applet to the requesting browser. Test results have shown that when serving a large file, such as a 15 MB java applet, performance time can improve 17% by serving the requested applet through the file system instead of through the network connection using the network protocols. Performance improvements may be even more noted as the file size increases.

Thus, preferred embodiments provide an improved mechanism for serving files when the program requesting the file through a network protocol is in fact running locally.

Conclusions and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications that may be made to this configuration without departing from the scope of the present invention.

Preferred embodiments were described with respect to certain network protocols, such as HTTP, HTTPS, and TCP/IP, used for transmitting and communicating HTTP requests over a network with a web browser. However, those skilled in the art will appreciate that communication protocols other than TCP/IP may be used to establish communication between the web browser and client 2 and that messaging protocols other than HTTP may be used to request and transmit files.

Preferred embodiments were described with respect to an Internet web browser for establishing communication with the TSM client to perform TSM client operations. However, in further embodiments other type of GUI and viewer programs may be used to provide a GUI to the TSM client services.

Preferred embodiments were described with respect to the IBM TSM storage management software. However, in alternative embodiments any storage management software, other than TSM, may be used which manages the storage of data among clients and a server, and performs data management operations such as backup, archive, restore, and migration.

Preferred embodiments were described with respect to accessing a web client Java applet using a network protocol.

However, those skilled in the art will appreciate that the preferred logic may be used to determine how to serve any type of web document or file, e.g., HTML, Java Applet, XML page, image files, video files, text file, programs, etc., based on whether the web browser is running locally or on a remote machine.

In summary, preferred embodiments disclose a system, method, and program for processing a file request from an application program. A file is maintained in a storage device accessible to a computer system. The file is capable of being accessed through a file system. A network connection is established with the application program using a network protocol. A request for the file is received from the application program via the network connection. A determination is then made as to whether the application program is executing in the computer system including the file system. If not, the file is transmitted over the network connection to the application program. Otherwise, the file is provided to the application program through the file system.

The foregoing description of the preferred embodiments of the invention has been presented for the purposes of illustration and description. It is not intended to be exhaustive or to limit the invention to the, precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**Microsoft, Windows, and Windows NT are registered trademarks of Microsoft Corporation; AIX and OS/2 are registered trademarks of IBM, MVS; NETSCAPE is a registered trademark of the Netscape Communications Corporation; JAVA and Solaris are trademarks of Sun Microsystems, Inc.; HP-UX is a registered trademark of Hewlett-Packard Company.

What is claimed is:

1. A method for processing a file request from an application program, comprising:
   providing a file in a storage device accessible to a computer system, wherein the file is capable of being accessed through a file system;
   establishing a network connection with the application program using a network protocol;
   receiving a request for the file from the application program via the network connection;
   determining whether the application program is executing in the computer system including the file system;
   transmitting the file over the network connection to the application program after determining that the application program is not executing in the computer system; and
   providing the application program the file through the file system after determining that the application program is executing in the computer system.

2. The method of claim 1, wherein the network connection with the application program is established using the TCP/IP protocol.

3. The method of claim 1, wherein the request for the file is transmitted using the HTTP protocol.

4. The method of claim 1, wherein the requested file is a member of the set of file types consisting of: Java applets, HTML files, text files, image files, video files, XML files, and programs.

5. The method of claim 1, wherein determining whether the application program is executing in the computer system, comprises determining network addresses of the application program and the computer system including the file system, wherein the application program is executing in the computer system when the determined network addresses of the computer system and application program are the same, and wherein the application program is not executing in the computer system when the determined network addresses are different.

6. The method of claim 5, further comprising determining whether the file request was received on a designated port and whether the file request comprises a name of a machine in which the application program is executing, wherein determining whether the application program is executing in the computer system, transmitting the file over the network, and providing the file through the file system occur after determining that the file request was received on the designated port.

7. The method of claim 1, wherein the application program is a web browser, and wherein providing the web browser the file through the file system comprises returning a file to the web browser indicating a pathname of the requested file in the storage device, wherein the web browser is capable of accessing the requested file through the file system using the pathname provided in the returned file.

8. The method of claim 1, further comprising:
   determining, after determining that the application program is executing in the computer system, whether the application program is capable of accessing the requested file directly through the file system after requesting the file through the network connection; and
   transmitting the file over the network connection to the application program after determining that the application program is not capable of accessing the requested file directly through the file system, wherein providing the requested file through the file system occurs after determining that the application program is capable of accessing the requested file directly through the file system after requesting the file through the network connection.

9. The method of claim 8, wherein providing the requested file comprises transmitting a pathname of the requested file in the storage device to the application program, wherein the application program uses the transmitted pathname to access the requested file directly from the storage device through the file system.

10. A method for interfacing an application program with a storage management system in a computer system, comprising:
   establishing a network connection with the application program using a network protocol;
   receiving a request from the application program for a program in a storage device accessible to the computer system, wherein the program is capable of being accessed through a file system and wherein the program will allow the application program to interface with the storage management system;
   determining whether network addresses of the computer in which the application program is executing and the computer including the file system are the same; and
   transmitting the requested program to the application program via a method that is a member of the set of methods consisting of: (i) a network connection using the network protocol and (ii) directly to the application program through the file system, wherein the application program executes the requested program to provide an interface with the storage management system to perform storage management operations on the computer system, and wherein the transmitting depends on the determining.

11. The method of claim 10, wherein the application program is a viewer program providing a graphical user interface through which a user can control storage management operations.

12. A method for interfacing an application program with a storage management system in a computer system, comprising:

establishing a network connection with the application program using a network protocol;

receiving a request from the application program for a program in a storage device accessible to the computer system, wherein the program is capable of being accessed through a file system and wherein the program will allow the application program to interface with the storage management system;

determining a network address of the computer in which the application program is executing and the computer including the file system;

determining whether the network addresses of the application program and the computer are the same, wherein the program is transmitted through the network connection to the application program after determining that the network addresses of the application program and the computer are different and wherein the program file is provided to the application program through the file system after determining that the network addresses of the application program and the computer system are the same; and transmitting the requested program to the application program via a method that is a member of the set of methods consisting of: (i) a network connection using the network protocol and (ii) directly to the application program through the file system, wherein the application program executes the requested program to provide an interface with the storage management system to perform storage management operations on the computer system.

13. The method of claim 12, wherein the application program is a web browser, and wherein providing the application program the file through the file system comprises returning a file to the web browser including a URL indicating a pathname of the requested program in the storage device, wherein the web browser accesses the requested program through the file system using the URL provided in the returned file.

14. The method of claim 13, wherein the program is implemented as an applet and wherein the web browser accesses a file including the applet embedded therein using the URL provided in the returned file.

15. A system for processing a file request from an application program, comprising:

a computer system;

a storage device accessible to the computer system including a file that is capable of being accessed through a file system;

program logic executed by the computer system, comprising:

(i) means for establishing a network connection with the application program using a network protocol;
(ii) means for receiving a request for the file from the application program via the network connection;
(iii) means for determining whether the application program is executing in the computer system including the file system;
(iv) means for transmitting the file over the network connection to the application program after determining that the application program is not executing in the computer system;
(v) means for providing the application program the file through the file system after determining that the application program is executing in the computer system.

16. The system of claim 15, wherein the network connection with the application program is established using the TCP/IP protocol.

17. The system of claim 15, wherein the request for the file is transmitted using the HTTP protocol.

18. The system of claim 15, wherein the requested file is a member of the set of file types consisting of: Java applets, HTML files, text files, image files, video files, XML files, and programs.

19. The system of claim 15, wherein the program logic for determining whether the application program is executing in the computer system, comprises means for determining network addresses of the application program and the computer system including the file system, wherein the application program is executing in the computer system when the determined network addresses of the computer system and application program are the same, and wherein the application program is not executing in the computer system when the determined network addresses are different.

20. The system of claim 19, wherein the program logic further comprises determining whether the file request was received on a designated port and whether the file request comprises a name of a machine in which the application program is executing, wherein the program logic for determining whether the application program is executing in the computer system, transmitting the file over the network, and providing the file through the file system occur after determining that the file request was received on the designated port.

21. The system of claim 15, wherein the application program is a web browser, and wherein the program logic for providing the web browser the file through the file system comprises means for returning a file to the web browser indicating a pathname of the requested file in the storage device, wherein the web browser is capable of accessing the requested file through the file system using the pathname provided in the returned file.

22. The system of claim 15, wherein the program logic further comprises:

means for determining, after determining that the application program is executing in the computer system, whether the application program is capable of accessing the requested file directly through the file system after requesting the file through the network connection; and means for transmitting the file over the network connection to the application program after determining that the application program is not capable of accessing the requested file directly through the file system, wherein providing the requested file through the file system occurs after determining that the application program is capable of accessing the requested file directly through the file system after requesting the file through the network connection.

23. The system of claim 22, wherein the program logic for providing the requested file comprises means for transmitting a pathname of the requested file in the storage device to the application program, wherein the application program uses the transmitted pathname to access the requested file directly from the storage device through the file system.

24. An article of manufacture for processing a file request from an application program, the article of manufacture comprising a computer usable media including at least one computer program embedded therein that causes the computer to perform:
- providing a file in a storage device accessible to a computer system, wherein the file is capable of being accessed through a file system;
- establishing a network connection with the application program using a network protocol;
- receiving a request for the file from the application program via the network connection;
- determining whether the application program is executing in the computer system including the file system;
- transmitting the file over the network connection to the application program after determining that the application program is not executing in the computer system;
- providing the application program the file through the file system after determining that the application program is executing in the computer system.

25. The article of manufacture of claim 24, wherein the network connection with the application program is established using the TCP/IP protocol.

26. The article of manufacture of claim 24, wherein the request for the file is transmitted using the HTTP protocol.

27. The article of manufacture of claim 24, wherein the requested file is a member of the set of file types consisting of: Java applets, HTML files, text files, image files, video files, XML files, and programs.

28. The article of manufacture of claim 24, wherein determining whether the application program is executing in the computer system, comprises determining network addresses of the application program and the computer system including the file system, wherein the application program is executing in the computer system when the determined network addresses of the computer system and application program are the same, and wherein the application program is not executing in the computer system when the determined network addresses are different.

29. The article of manufacture of claim 28, further comprising determining whether the file request was received on a designated port and whether the file request comprises a name of a machine in which the application program is executing, wherein determining whether the application program is executing in the computer system, transmitting the file over the network, and providing the file through the file system occur after determining that the file request was received on the designated port.

30. The article of manufacture of claim 24, wherein the application program is a web browser, and wherein providing the web browser the file through the file system comprises returning a file to the web browser indicating a pathname of the requested file in the storage device, wherein the web browser is capable of accessing the requested file through the file system using the pathname provided in the returned file.

31. The article of manufacture of claim 24, further comprising:
- determining, after determining that the application program is executing in the computer system, whether the application program is capable of accessing the requested file directly through the file system after requesting the file through the network connection; and
- transmitting the file over the network connection to the application program after determining that the application program is not capable of accessing the requested file directly through the file system, wherein providing the requested file through the file system occurs after determining that the application program is capable of accessing the requested file directly through the file system after requesting the file through the network connection.

32. The article of manufacture of claim 31, wherein providing the requested file comprises transmitting a pathname of the requested file in the storage device to the application program, wherein the application program uses the transmitted pathname to access the requested file directly from the storage device through the file system.

33. An article of manufacture for interfacing an application program with a storage management system in a computer system, the article of manufacture comprising a computer usable media including at least one computer program embedded therein that causes the computer to perform:
- establishing a network connection with the application program using a network protocol;
- receiving a request from the application program for a program in a storage device accessible to the computer system, wherein the program is capable of being accessed through a file system and wherein the program will allow the application program to interface with the storage management system;
- determining whether network addresses of the computer in which the application program is executing and the computer including the file system are the same; and
- transmitting the requested program to the application program via a method that is a member of the set of methods consisting of: (i) a network connection using the network protocol and (ii) directly to the application program through the file system, wherein the application program executes the requested program to provide an interface with the storage management system to perform storage management operations on the computer system, and wherein the transmitting depends on the determining.

34. The article of manufacture of claim 33, wherein the application program is a viewer program providing a graphical user interface through which a user can control storage management operations.

35. An article of manufacture for interfacing an application program with a storage management system in a computer system, the article of manufacture comprising a computer usable media including at least one computer program embedded therein that causes the computer to perform:
- establishing a network connection with the application program using a network protocol;
  - receiving a request from the application program for a program in a storage device accessible to the computer system, wherein the program is capable of being accessed through a file system and wherein the program will allow the application program to interface with the storage management system;
  - determining a network address of the computer in which the application program is executing and the computer including the file system;
  - determining whether the network addresses of the application program and the computer are the same, wherein the program is transmitted through the network connection to the application program after determining that the network addresses of the application program and the computer are different and wherein the program file is provided to the application program through the file system after determining that the network addresses of the application program and the computer system are the same; and transmitting the requested program to the application program via a method that is a member of the set of methods consisting of: (i) a network connection using the network protocol and (ii) directly to the application program through the file system, wherein the application program executes the requested program to provide an interface with the storage management system to perform storage management operations on the computer system.

36. The article of manufacture of claim 35, wherein the application program is a web browser, and wherein providing the application program the file through the file system comprises returning a file to the web browser including a URL indicating a pathname of the requested program in the storage device, wherein the web browser accesses the requested program through the file system using the URL provided in the returned file.

37. The article of manufacture of claim 36, wherein the program is implemented as an applet and wherein the web browser accesses a file including the applet embedded therein using the URL provided in the returned file.

* * * * *